| United States Patent [19] | [11] Patent Number: 4,989,902 |
| Putch | [45] Date of Patent: Feb. 5, 1991 |

[54] RATCHETING AND THREADED WELL CONNECTOR

[75] Inventor: Samuel W. Putch, Houston, Tex.

[73] Assignee: Norman A. Nelson, Houston, Tex. ; a part interest

[21] Appl. No.: 190,610

[22] Filed: May 5, 1988

[51] Int. Cl.⁵ ............................................. F16L 35/00
[52] U.S. Cl. ...................................... 285/18; 285/355; 285/351; 285/392; 285/921
[58] Field of Search .................... 285/33, 34, 141, 391, 285/333, 334, 330, 922, 18, 355, 390, 392, 921

[56] References Cited

U.S. PATENT DOCUMENTS

| 2,296,198 | 9/1942 | Boynton | 285/922 |
| 2,542,679 | 3/1951 | Kernitz | 285/334 |
| 2,849,245 | 8/1958 | Baker | 285/141 |
| 3,345,084 | 10/1967 | Hanes et al. | 285/34 |
| 4,607,865 | 8/1986 | Hughes | 285/18 |
| 4,844,510 | 7/1989 | Theiss et al. | 285/18 |

Primary Examiner—Dave W. Arola
Attorney, Agent, or Firm—Fulbright & Jaworski

[57] ABSTRACT

A ratcheting and threaded connector for connecting an upper and lower tubular member which allows an upper member to be connected to a lower member with a ratcheting action and on subsequent rotation causes a threaded spring to move into position to engage shoulders on both the upper and lower members to place them in a rigid and tight relationship. Multiple load bearing shoulders on each of the members coact with load bearing shoulders on the spring to provide a substantially equal balance load distribution and allows the connector spring to have a minimum thickness.

10 Claims, 4 Drawing Sheets

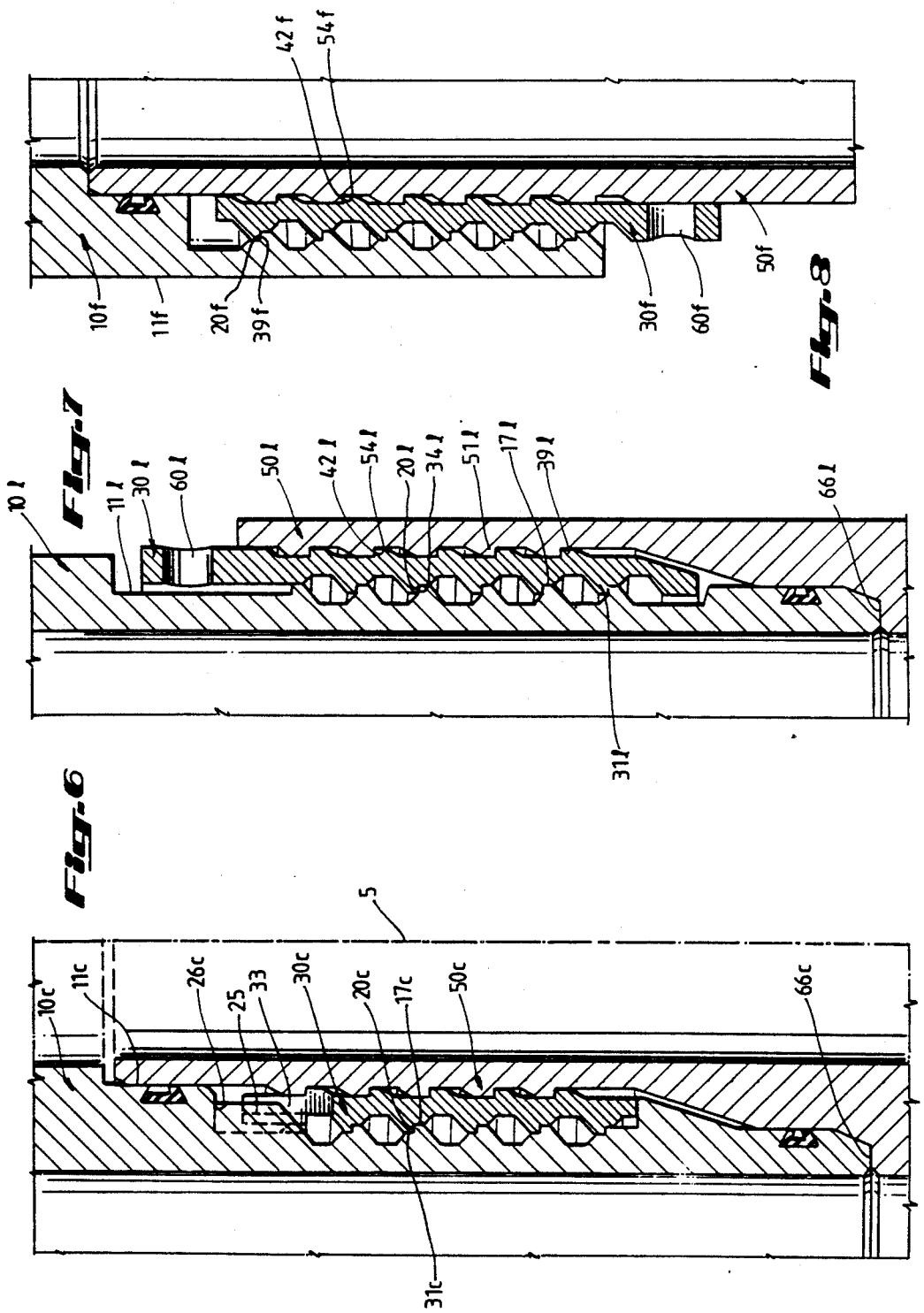

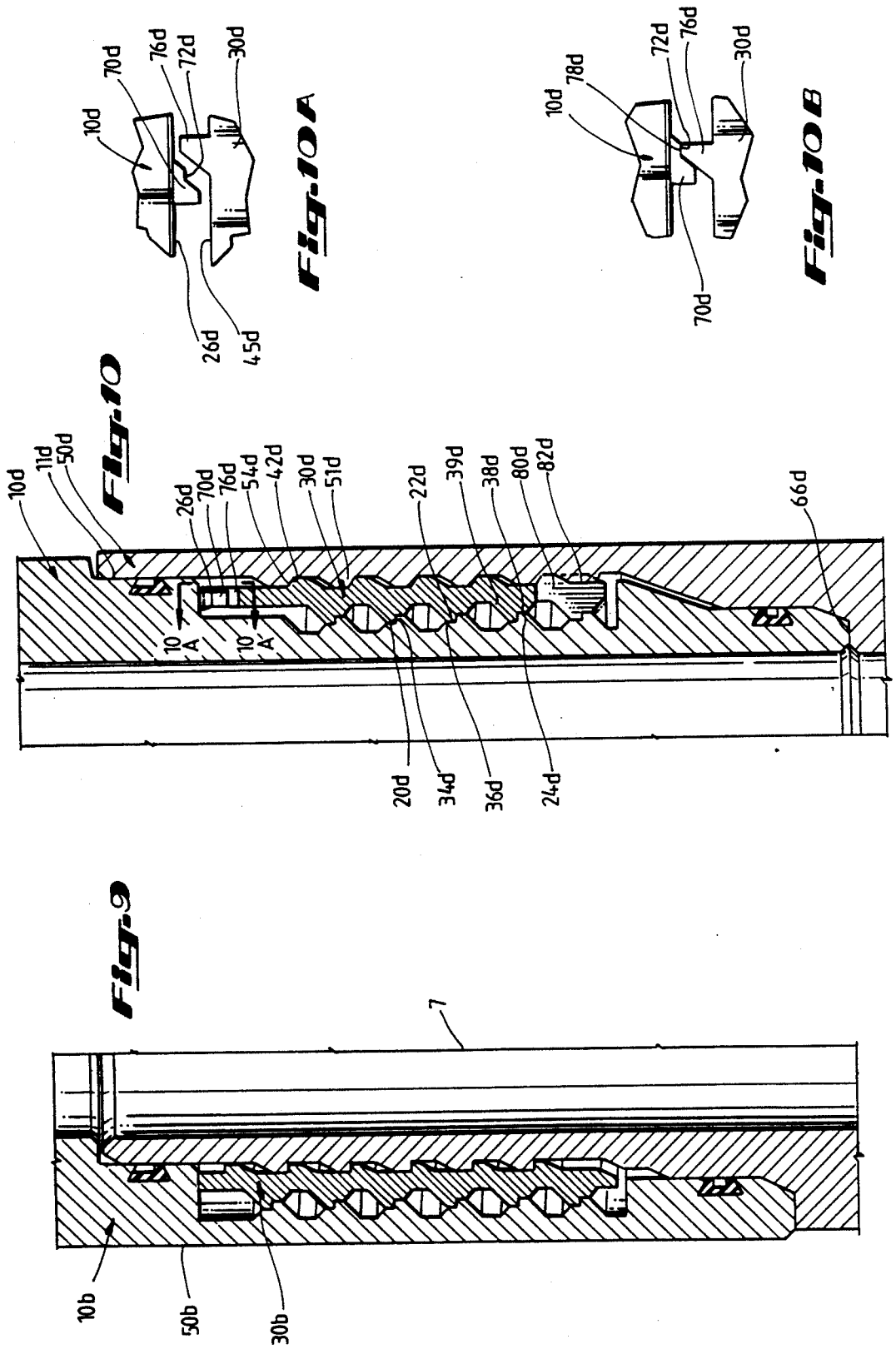

4,989,902

1

RATCHETING AND THREADED WELL CONNECTOR

BACKGROUND OF THE INVENTION

A remote connection and/or disconnection of tubular members, such as encountered in oil/gas wells, presents a major problem in the event the connection or disconnection must be made downhole. Various types of ratcheting and/or threaded connectors have been suggested such as in U.S. Pat. Nos. 2,849,245 and 4,607,865 for making such connections. Such devices use a spring connector having threads which may ratchet over and be threadably connected to a tubular member and which is then backed up and locked in place by locking shoulders. However, such structures generally carry the load between the upper and lower tubular members by an end shoulder.

The present invention is directed to a ratcheting and threaded well connector which provides a balanced load distribution arrangement between the upper and lower tubular members to provide the strongest connection possible and also allows the spring connector element to have a minimum thickness for providing a connection in a smaller radial distance with strength comparable to a conventional threaded type connection.

SUMMARY

The present invention is directed to a ratcheting and threaded connector for connecting an upper and lower tubular member, one of which is a male member and the other of which is a female member, together. Multiple load bearing shoulders are provided on the upper member and multiple load bearing shoulders are provided on the lower member, each of which coacts with coacting shoulders on a spring-biased expandable and contractible ratcheting and threaded connector element thereby providing a substantially equally balanced load distribution between the upper and lower members. Such a connection provides a strong connection for a stab-type connector in a given radial distance.

A further object of the present invention is wherein the lower tubular member has threads for mating with the upper tubular member and a spring-biased and resiliently expandably and contractible ratcheting and threaded connector element is positioned on the upper tubular member for longitudinal and rotational engagement with the lower tubular member. The spring element includes mating threads on one side for coacting with the threads on the lower tubular member. Coacting circumferentially extending shoulders on the upper tubular member and the spring element are provided for engagement when the upper tubular member is rotated relative to the lower tubular member for providing a rigid interconnection. The area of the coacting circumferentially extending shoulders on the upper tubular member and spring element are substantially equal to the coacting area between the threads on the lower tubular member and the mating threads on the spring element thereby providing a substantially balanced load distribution between the upper and lower tubular members and allowing the connector element to have a minimum thickness.

Still a further object of the present invention is wherein the coacting circumferentially extending shoulders on the upper tubular member and the spring element are coacting threads.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 6 is a fragmentary elevational view, in cross section, of another embodiment of the present invention, FIG. 7 is a fragmentary, elevational view, in cross section, of still another embodiment of the present invention, FIG. 8 is a fragmentary, elevational view, in cross section, of a further embodiment of the present invention, FIG. 9 is a fragmentary, elevational view, in cross section a further embodiment, FIG. 10 is a fragmentary, elevational view, in cross section, of still a further embodiment of the present invention, FIG. 10A is a cross-sectional view taken along the line A—A of FIG. 10, and FIG. 10B is a view similar to FIG. 10A shown in the engaged position.

DESCRIPTION OF THE PREFERRED EMBODIMENTS

Figure 1:
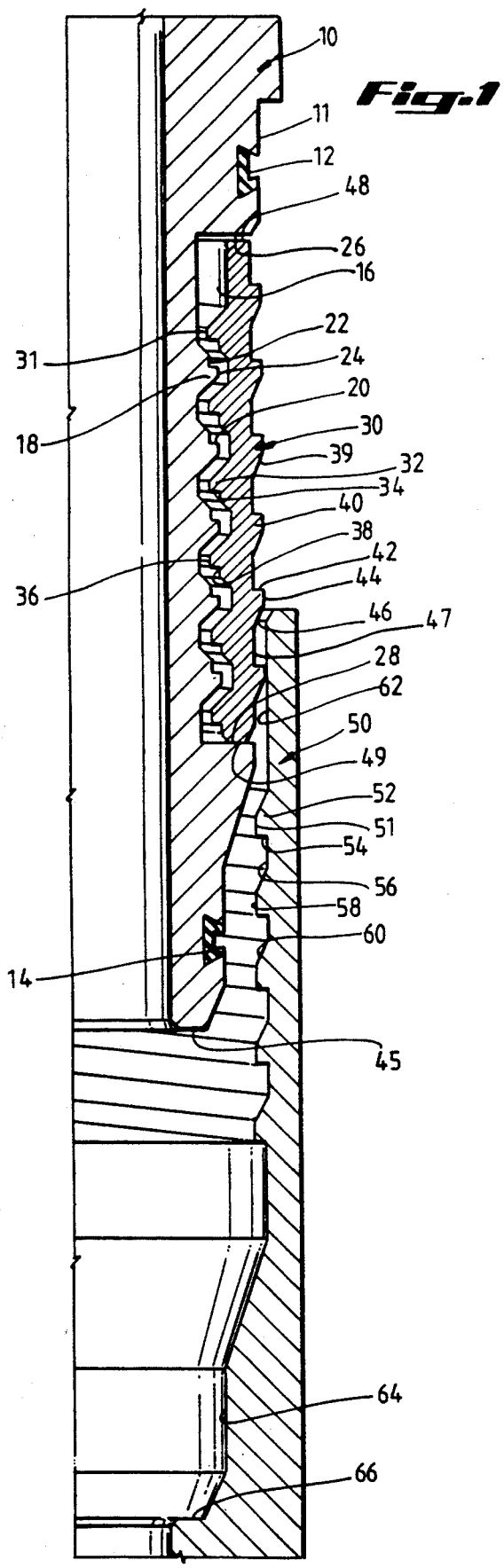
FIG. 1 is a fragmentary, elevational view, in cross section, illustrating the beginning of inserting the upper tubular member into a lower tubular member.

The preferred embodiment of the present invention is best seen in FIGS. 1–4 which generally indicates a ratcheting and threaded connection 10 for connecting an upper tubular member 11 and a lower tubular member 50, one of which is a male member and the other of which is a female member, here shown as the upper tubular member 11 being the male member and the lower tubular member 50 being the female member.

The upper tubular member 11 includes a first seal 12 located in a groove near its upper end and a second seal 14 located in a groove near its lower end. The member 11 includes an upper shoulder 26 and a lower shoulder 28 and a threaded section 16 is provided between the shoulders 26 and 28. The male thread form 17 of the threaded section 16 includes an outwardly extending shoulder 18 with an upwardly facing surface 20 and cylindrical surfaces 22 and 24 located, respectively, at the inner and outer circumferences of the surface 20.

A spring-biased and resiliently expandable and contractible ratcheting and threaded connector element 30 is provided, which is formed from a cylindrical section cut longitudinally to form a C-ring and is located between the upper shoulder 26 and the lower shoulder 28. The connector element 30 includes stop shoulders 48 and 49 located at its upper and lower ends, respectively, and a thread 31 on its inner circumference that mates with the thread 16 on upper member 11. The thread 31 includes an inwardly extending shoulder 32 with a downwardly facing surface 34 and cylindrical surfaces 36 and 38 located respectively at the inner and outer circumference of surface 34.

The outer circumference of spring element 30 includes a thread 39 which includes an outwardly extending shoulder 40 with an upwardly facing surface 42 and a cylindrical surface 44 on its outer circumference and a downwardly and inwardly facing tapered surface 46 below the cylindrical surface 44 that extends to the cylindrical surface 47. The lower tubular member 50 includes a thread generally indicated by the reference numeral 51 on its inner circumference that mates with the thread 39 on the element 30 and includes inwardly extending shoulder 52 with a downwardly facing surface 54 and two cylindrical surfaces 56 and 58 located, respectively, at the outer and inner circumference of the surface 54 and an upwardly and outwardly extending surface 60 that connects the two cylindrical surfaces 56 and 58. Lower tubular member 50 also includes an upper seal bore 62, a lower seal bore 64, and an upwardly facing stop shoulder 66.

Referring now to FIG. 1, as the upper tubular member 11 is lowered into the lower tubular member 50, the resiliently expandable and contractible connector element 30 is forced upwardly until its upper shoulder 48 contacts downwardly facing shoulder 26 on the tubular member 11. Continued downwardly movement of the upper tubular member 11 causes the tapered surfaces 46 on the thread 39 to contact the tapered surfaces 60 of the thread 51, which in turn causes the spring-biased connector element 30 to collapse as it passes through the inner cylindrical surfaces 58 of the thread 51. As the upper tubular member 11 continues downwardly relative to the lower tubular member 50 the threaded connector element 30 expands and contracts in a ratcheting fashion as it passes through the thread 50 until shoulder 45 of the upper tubular member 11 contacts shoulder 66 of the lower tubular member 50 and further downward movement stops.

Figure 2:
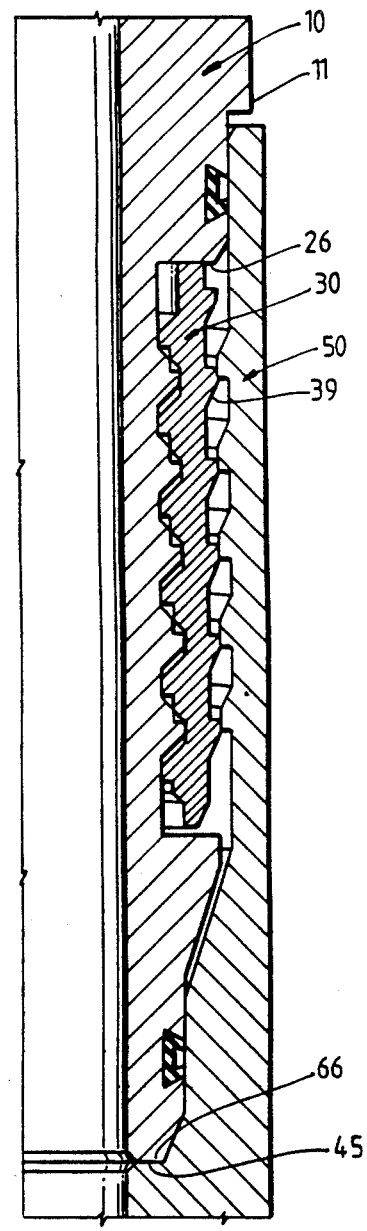
FIG. 2 is a fragmentary, elevational view, in cross section, illustrating one possible position of the connection after longitudinal movement of the upper and lower tubular member together.
Figure 3:
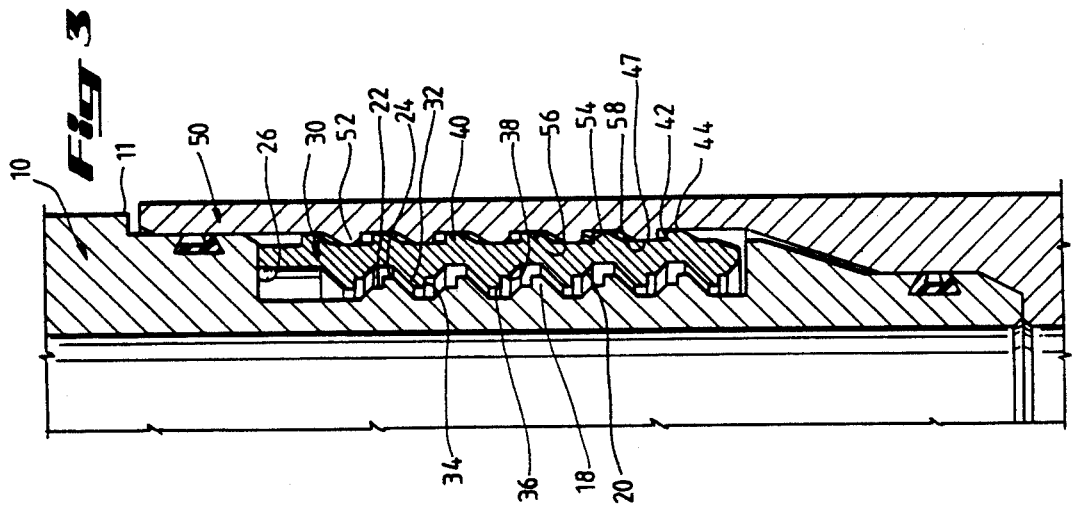
FIG. 3 is a fragmentary, elevational view, in cross section, illustrating another possible position of the connection after longitudinal movement of the upper and lower tubular members together

At this point, the relationship of the upper tubular member 11 with respect to the lower tubular member 50 will be such that the spring-biased connector element 30 will be either in the collapsed position, as best seen in FIG. 2, or in an expanded position, as best seen in FIG. 3.

In order to make up the connection 10 in a rigid and tight manner, rotation of the upper member 11 relative to the lower member 50 will cause the spring-biased element 30 to move into position to engage shoulders on both the upper member 11 and the lower member 50. Referring now to FIG. 2, as the upper member 11 is rotated, it will either rotate inside of the spring element 30 or both the member 11 and spring element 30 will rotate inside the lower member 50. If the upper member 11 rotates in the spring element 30, this will force the spring element 30 up against shoulder 26 on member 11 and thereafter cause it to rotate with the member 11 until the thread 39 on the spring element 30 aligns with the thread 51 in the lower member 50 permitting the spring element 30 to expand as shown in FIG. 3.

Figure 4:
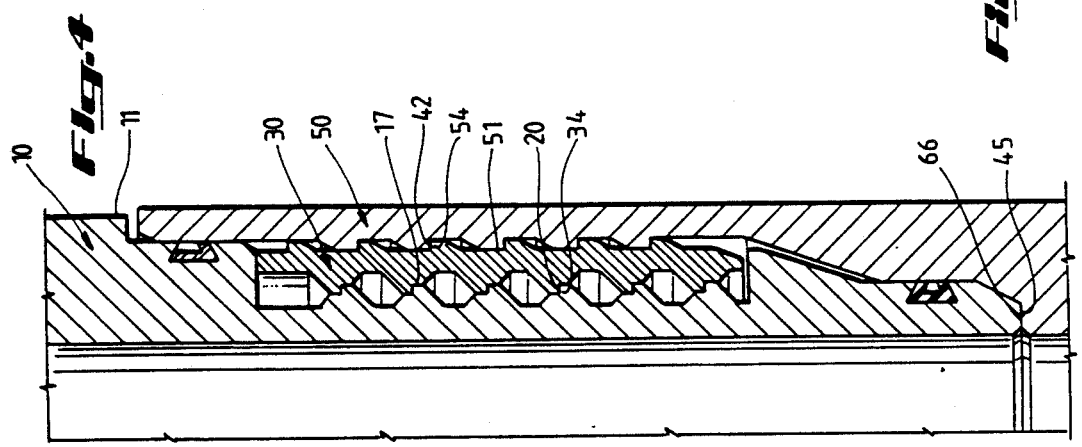
FIG. 4 is a fragmentary, elevational view, in cross section, illustrating the made-up connection of FIGS. 1–3.

Referring now to FIG. 3, the spring element 30 is shown in its expanded position and is free to be moved vertically to make contact between shoulders 40 and 52 on the outer circumference of the spring element 30 and lower circumference of lower member 50, respectively, and/or between shoulders 18 and 32 on the outer circumference of the upper member 11 and the inner circumference of the spring element 30, respectively. However, as upper member 11 is rotated, upwardly facing surface 20 will come into contact with downwardly facing surface 34 causing the spring element 30 to rotate with the upper member 11 until its upwardly facing surface 42 contacts downwardly facing shoulder 54, as best seen in FIG. 4. Prior to shoulders 20 and 34 making contact, the male cylindrical surfaces 22 and 24 of thread 17 have moved into the female cylindrical surfaces 36 and 38 of thread form 31 on the element 30. Since the two outer cylindrical surfaces 44 and 47 of thread 39 on the outer circumference of element 30 have already expanded into contact with inner cylindrical surfaces 56 and 58 of thread 51, the spring element 30 is trapped between the upper member 30 and the lower member 50.

Referring to FIG. 4, with the spring element 30 acting against downwardly facing surface 54 on lower member 50 and upwardly facing shoulder 20 on upper member 11, continued rotation tends to force the member 11 down with respect to the lower member 50. But since shoulder 45 has already contacted shoulder 66, this movement is resisted creating a rigid and tight connection. This result is the same as if the upper member 11 and the spring element 30 were a single element having a thread 39 on its outer circumference.

Thus it is noted that the present connector 10 permits the upper assembly to be completely inserted into the lower assembly 50 without any rotation by ratcheting therein without damaging any threads. Subsequent rotation causes the spring element 30 to move into position to engage shoulders on both the upper member 11 and lower member 50 and force them into a strong connection. It is to be particularly noted, from FIG. 4, that there are multiple load bearing shoulders between the upper member 11 and the spring element 30 and generally corresponding multiple load bearing shoulders on the lower member 50 coacting with the spring element 30. This provides a substantially equally balanced load distribution arrangement between the two members 11 and 50 instead of carrying the load on the ends of the element 30 as in the prior art. Furthermore, the use of the multiple load bearing shoulders on both sides of the element 30 provide a spring element 30 having a minimum thickness. This is particularly important in well tool connections where radial distance is critical. Therefore, the present invention provides the strongest connection possible for a stab-type connector in a given radial distance.

Referring to FIG. 4, if the thread forms 31 and 39 have the same pitch and direction, and are offset vertically from each other, shoulders 34 and 42 will have the same relationship as shown in FIG. 4 at any point in their circumference. This assures that the load bearing portion of spring element 30 between its shoulders 34 and 42 is always in compression, thereby providing the strongest load condition for this element and thereby permits the use of a less thick element 30 for a given load.

Other and further embodiments of the present invention may be provided, some of which will be more fully described hereinafter, wherein like parts to those shown in FIGS. 1-4 are similarly numbered with the addition of the suffixes "a", "b", "c", "d", "e" and "f".

Figure 5:
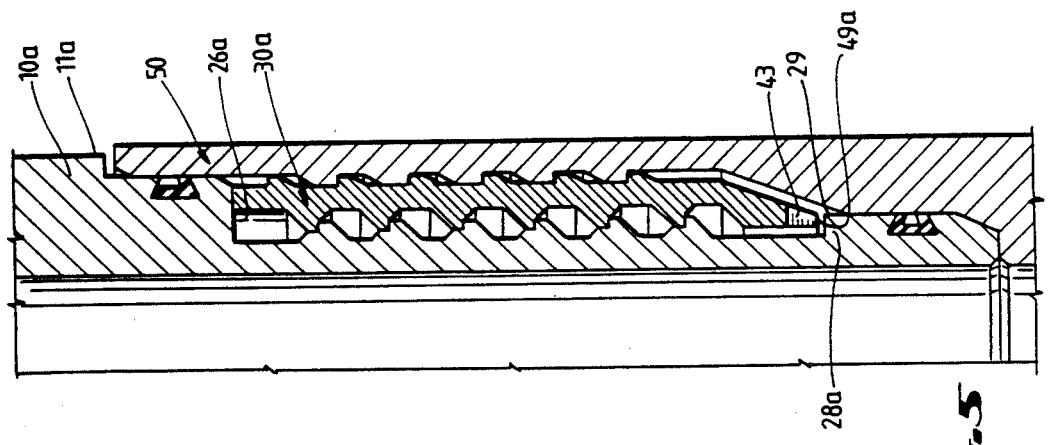
FIG. 5 is a fragmentary, elevational view, in cross section, illustrating another embodiment of the present invention.

Referring now to FIG. 5, a key 29 has been added at the shoulder 28a on upper member 11a and a slot 43 has been provided in the bottom of threaded spring 30a. The length of spring element 30a is such that when it is up against shoulder 26a, its bottom shoulder 49a will not contact the top of key 29. The key 29 and slot 43 are located circumferentially so as to position the spring element 30a on upper member 11a so that the spring element 30a is in position to be collapsed on upper member 11a. An alternate method for positioning the spring element 30a would be to have a spring loaded detent, or shear pin arrangement that maintains contact with slot 43 on threaded spring 30a until rotation overcomes the restraining force of the detent or shear pin.

The design shown in FIG. 6 is the same as that shown in FIGS. 1 through 4, except that the spring element 30c has a longitudinal slot 33 cut in its upper portion that continuously engages key 25 located just below shoulder 26c on upper member 11c. This keeps the spring element 30c in a fixed circumferential position with respect to upper member 11c so that spring element 30c can be moved up and collapsed onto upper member 11c or moved down to contact surface 20c. The threads 17c and 31c on upper member 10c and spring element 30c, respectively, can be replaced with circumferential shoulders that have the same cross section profile as the thread form in FIG. 1, without changing the operation of this connector 10c or the appearance of the cross section through upper member 11c and spring element 30c. The operation of this design, with either threads or shoulders on the inner member 11c is the same as described in FIGS. 1 through 4, except that the step where upper member 11 rotates in threaded spring 30 is eliminated.

FIG. 6, which is a partial cross-sectional view, shows a center line 3 to the left, as is done in the FIGS. 1 through 5. However, the center line could be to the right in all of these as depicted by the dotted lines 5 shown in FIG. 6. In FIG. 6, the net effect of doing this is that the lower member 50c is changed from a female to a male, upper member 11c is changed from a male to a female and spring element 30c must be biased inwardly rather than outwardly. However, the description of the structure as shown in the cross section, does not change and the operation of the connector 10c is still the same except that upper assembly 11c is stabbed over rather than into lower member 50c.

FIG. 7 is still another version of this invention where the spring element 30e is rotated by an external force without rotating upper member 11e. Lower member 50e is basically the same as that shown in FIGS. 1 through 4 and with female thread 51e on its inner circumference. Upper member 11e, however, has a shoulder form 17e such as described for one version of FIG. 6. Spring element 30e has thread form 39e on its outer circumference that mates with thread 51e of lower member 50e and has a multiple shoulder form 31e on its inner circumference that mates with multi-shoulder form 17e of upper member 11e. The upper portion of threaded spring 30e extends above the top of lower member 50e and includes a means for attaching an external rotation means to it such as a spanner wrench that engages holes 60e. In operation, the upper assembly 11e is stabbed into lower member 50e which causes spring element 30e to collapse and expand as it passes through the thread 51e, in a ratcheting fashion. When upper assembly 10e bottoms out by engaging shoulder 66e, the spring element 30e may be in the collapsed position such as shown in FIG. 2 or it may be in an expanded position such as shown in FIG. 3. In any event, spring element 30e is rotated by an external force and if spring element 30e is collapsed it will expand and engage threads 51e; continued rotation of spring element 30e causes its surface 42e to bear up against surface 54e and surface 34e to bear down against surface 20e, thereby forcing upper member 11e down against surface 66e, creating a rigid and tight connection. To disconnect, the spring element 30e is rotated in the opposite direction as upper member 11e is pulled upwardly until the thread forms are completely unscrewed.

FIG. 8 shows a reversed relationship of the design shown in FIG. 7, in that the lower member 50f is a male design and upper assembly 10f is a female design. Its operation is essentially the same as that described for FIG. 7.

FIG. 9 is basically the same as the designs shown in FIGS. 1 through 4 except that, in effect, the center line 7 has been moved from the left hand side as shown in FIGS. 1 through 4 to the right hand side as shown in FIG. 9. The net result is that lower member 50b is male, upper assembly 10b is a female, and threaded spring 30b has the same thread forms but is biased inwardly instead of outwardly. The operation of this version is the same as described for FIGS. 1 through 4.

In FIG. 10, the male thread 39d on spring element 30d and the female thread 51d on lower member 50d have been replaced with multiple mating circumferential shoulder forms 39d and 51d whose cross section differ from that of the replaced thread form in that the contact surface between downwardly facing surface 42d and upwardly facing surface 54d must be tapered sufficiently to permit the assembly to be disconnected. Also an anti-rotation lug 70d is located on the bottom side of shoulder 26d and includes a tapered ramp and downwardly facing surface 72d as shown in FIG. 10a. A mating lug 76d on shoulder 48d of threaded spring 30d is designed so that when its upward facing surface 78d engages downward facing surface 72d as shown in FIG. 10b, the threaded spring 30d is in position to expand into the grooves of lower member 50d when upper assembly 10d is fully inserted into lower member 50d. Also a key 82d is located in the bottom of the grooved portion of lower member 50d and mating longitudinal slots 80d are cut in the bottom of threaded spring 30d. When upper member 10d is stabbed into lower member 50d and lugs 70d and 76d are mated as described above, spring element 30d is in position to expand, however, it may not be in a mating position with respect to lug 82d and slot 80d. By rotating the upper member 10d, spring element 30d is also rotated by virtue of the contact between lugs 70d and 76d. When slot 80d aligns with key 82d, spring element 30d will be free to expand. The rotation of spring element 30d is stopped by virtue of engagement of slot 80d with key 78d and at the same time continued rotation of upper member 11d is stopped by virtue of contact between lugs 70d and 76d; this will be apparent by an increase in rotating torque. The upper member 11d is then rotated in the opposite direction which causes surface 20d to contact surface 34d and force the upper member 11d down against surface 66d and threaded spring 30d up against surfaces 42d, creating a rigid and tight connection. To disconnect, upper assembly 10d is rotated in the first direction while maintaining an upward pull on upper assembly 11d. When the cylindrical surfaces 22d and 24d on upper member 10d have cleared cylindrical surfaces 36 and 38d of threaded spring 30d, the upward pull on 11d causes the tapered surface 42d acting on tapered surface 54d to collapse threaded spring 30d. At this point rotation is stopped and the upper member 11d is pulled out of lower member 50d, causing the spring element 30d to expand and contract in a ratcheting fashion in the grooves of lower member 50d until upper member 11d is removed from lower member 50d.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A ratcheting and threaded connection for remotely connecting an upper and a lower tubular member in a well, one of which is a male member and the other of which is a female member, comprising, said lower tubular member having threads for mating with the upper tubular member, a spring biased and resiliently expandable and contractible cylindrical ratcheting and threaded connector element positioned on the upper tubular member for longitudinal and rotational engagement with the lower tubular member, said connector element including mating threads on one side for coacting with the threads on the lower tubular member, coacting circumferentially extending shoulders on the upper tubular member and the connector element for engagement when the upper tubular member is rotated relative to the lower tubular member for providing a rigid interconnection, said coacting circumferentially extending shoulders on the upper tubular member and the connector element are coacting threads, the area of the coacting circumferentially extending shoulders on the upper tubular member and connector element being substantially equal to the coacting area between the threads on the lower tubular member and the mating threads on the connector element thereby providing a substantially balanced load distribution between the upper and lower tubular members and allowing the connector element to have a minimum thickness, wherein the threads on the connector elements that coact with the upper and lower tubular members, respectively are vertically offset from each other, and said threads on the connector element that coact with the upper and lower tubular members have the same pitch and direction.

2. The apparatus of claim 1 wherein the upper tubular member includes a downwardly facing shoulder and the lower tubular member includes an upwardly facing stop shoulder for engaging the downwardly facing shoulder on the upper member.

3. The apparatus of claim 1 including seal means between the upper and lower tubular member.

4. The apparatus of claim 1 wherein the coacting threads between the connector element and each of the upper and lower tubular members includes an upwardly facing radially extending horizontal surface coacting with a downwardly facing radially extending horizontal surface.

5. The apparatus of claim 1 wherein the coacting circumferentially extending shoulders on the upper tubular member and the connector element include mating cylindrical surfaces that lock the connector element in its engaged position with the lower tubular member.

6. The apparatus of claim 1 wherein threads on each side of the connector element that coact with the threads on the upper and lower tubular members, respectively, are vertically offset so that the roots of the threads on one side substantially coincide with the crest of the threads on the other side of the connector element, thereby allowing the connector element to have a minimum thickness and maximum load carrying capacity.

7. The apparatus of claim 1 wherein the connector element extends out of the connection between the upper and lower member for engagement and rotation independently of the member for making up the connection.

8. A ratcheting and threaded connection for remotely connecting an upper and lower tubular member in a well one of which is a male member and the other of which is a female member, comprising, said lower tubular member having threads for mating with the upper tubular member and including an upwardly facing stop shoulder, said upper tubular member having a downwardly facing stop shoulder that contacts said stop shoulder on the lower tubular member as the two are brought together thereby preventing the upper member from passing beyond this point, and positioning the two for subsequent engagement, a spring biased and resiliently expandable and contractible cylindrical ratcheting and threaded connector element positioned on the upper tubular member and including mating threads on one side for coacting with the threads on the lower tubular member, for longitudinal and rotational engagement with the lower tubular member, coacting circumferentially extending shoulders located on the upper tubular member and on the connector element for engagement when the super tubular member is rotated relative to the lower tubular member, said rotation driving the upper tubular member against the stop shoulder on the lower tubular member, thereby causing the connection between the two tubular members to become rigid and capable of being tightened to a high torque level.

9. The apparatus of claim 8 wherein the number of coacting circumferentially extending shoulders on the upper tubular member and the lower tubular member are substantially equal and have substantially equal contact area with the connector element thereby providing a substantially balanced load distribution on the connector element.

10. The apparatus of claim 9 wherein the coacting circumferentially extending shoulders on the upper tubular member and the connector element include mating cylindrical surfaces that back the connector element in its engaged position with the lower tubular member.

* * * * *

UNITED STATES PATENT OFFICE
CERTIFICATE OF CORRECTION

Patent No. 4,989,902   Dated February 5, 1991

Inventor(s) Samuel W. Putch

It is certified that error appears in the above-identified patent and that said Letters Patent is hereby corrected as shown below:

Column 8, line 47, delete "super" and insert -- upper --.

Signed and Sealed this

Twentieth Day of October, 1992

Attest:

DOUGLAS B. COMER

*Attesting Officer*   Acting Commissioner of Patents and Trademarks